Feb. 25, 1969 R. E. LOOSEN 3,429,430

TAPE REEL

Filed June 16, 1967

Sheet 1 of 3

INVENTOR.

RONALD E. LOOSEN

BY Huebner & Worrel

ATTORNEYS.

INVENTOR.
RONALD E. LOOSEN
BY Huebner & Worrel
ATTORNEYS.

INVENTOR.
RONALD E. LOOSEN
BY Huebner & Worrel
ATTORNEYS.

United States Patent Office 3,429,430

Patented Feb. 25, 1969

3,429,430

TAPE REEL

Ronald E. Loosen, 6245 Oakdale Ave., Woodland Hills, Calif. 91364

Filed June 16, 1967, Ser. No. 646,593

U.S. Cl. 206—52 12 Claims

Int. Cl. B65h 55/00, 75/02

ABSTRACT OF THE DISCLOSURE

A reel and cover combination for the storage and use of magnetic tape or film. The cover is mounted on hub structure of the reel for movement in a generally helical path between a closed, substantially dust-tight position and an open position wherein the tape or film may be used. The cover is biased toward the closed position, and is cammed outwardly by rotary movement thereof to the open position where it is locked during use of the tape or film, release of the lock permitting the biasing means to automatically return the cover to its closed position.

*Background of the invention*

It is conventional practice to protect magnetic tape and film reels against dust and other foreign materials when not in use by storing the reels in two-part canisters or protective containers. In the case of computer tape reels, it is essential that such protective containers provide a substantially complete seal because such a large amount of information is packed onto a computer tape in such a relatively small area that even a speck of dust can cause one "bit" of information to be dropped, thereby impairing the ultimate result from the readout. Considerable attention in recent years has been directed to the provision of such reel storage canisters which provide a good seal, and yet at the same time are not too difficult to open.

Nevertheless, the use of such separate protective containers for storing tape and film reels involves a number of serious disadvantages which are overcome by the present invention. For one thing, a considerable amount of operator time is required to open the separate storage container and remove the reel for use, and then after use to replace the reel in the container and again close the container.

Another problem is that such a protective container must be considerably larger than the reel which is stored therein so that excessive amounts of storage space are required.

Another problem in connection with the conventional storage of tape and film reels in separate canisters is that identification of the tape or film is normally placed on the canister, and when the reel is removed from the canister for use, the identification becomes separated from the reel. This can cause serious complications if the reel is not immediately put into the canister after use, and particularly if the reel is inadvertently placed in the wrong canister after use. With regard to placing the tape or film reel back in the canister, because of the effort required to do this and to be sure the canister is properly closed, operators will not always put the reel back into its container immediately after use, which can result in an adverse accumulation of dust or other foreign materials on the tape or film.

Even when such conventional reel storage canisters are properly employed, their use still involves a substantial amount of undesirable handling of the tape or film reel while it is out of the canister, since it is necessary to lift the reel out of the canister, carry the reel over to the apparatus upon which is to be employed and install the reel on the spindle or transport of the machine; and then after use to remove the reel from the machine, carry it to the canister, and then place it back in the canister and replace the cover on the canister.

Because of these problems in connection with the conventional canister means for storing tape and film reels, there have been several prior art reel and cover combinations wherein the cover part of the combination is axially shifted from a closed, storage position to an open, operative position of the reel. However, none of these prior art combined reel and cover combinations have been satisfactory, and accordingly heretofore such devices have not come into any substantial usage as replacements for the conventional storage containers. In such prior art devices, the cover was arranged for straight axial sliding movement relative to the body of the reel, which, in such larger diameter but relatively thin structures, produced a tendency to bind or wedge, making manipulation difficult, and causing sealing to be too unsure for satisfactory usage for storing computer tape.

*Summary of the invention*

In view of these and other problems in the art, it is an object of the present invention to provide a reel and cover combination for the storage and use of magnetic tape, film or other strip material, wherein the cover is mounted on hub structure of the reel for movement between closed and open positions in a generally spiral or helical path, whereby movement of the cover between its said closed and open positions is smoothly and easily affected without any binding or wedging tendency between the parts.

Another object of the invention is to provide a reel and cover combination of the character described wherein the cover, in its closed position, cooperates with portions of the reel to provide a substantially dust-tight enclosure about the flexible strip on the reel.

Another object of the invention is to provide a reel and cover combination of the character described wherein the cover portion has an annular peripheral flange which is sealingly engaged against the generally flat annular base portion of the reel in the closed position, and which, together with such annular base of the reel, serves as a guide for paying out and receiving the strip of flexible material in operation of the combination.

Another object is to provide a reel and cover combinatio wherein the cover portion is particularly adapted to be moved from its closed position to its open position, and then from its open position back to its closed position, while the reel is operatively engaged upon the spindle or transport of the machine for using the flexible strip material on the reel, whereby the flexible strip material is completely enclosed within the substantially dust-tight enclosure formed by the reel and cover combination in their closed relationship at all times except when the combination is actually mounted on a machine for use, and the flexible strip is only exposed externally of the reel and cover combination when in actual usage.

Another object of the invention is to provide a reel and cover combination of the character described wherein movement of the cover from its closed to its open position is effected by a simple rotational movement of the cover while the reel is mounted on the spindle or transport, the cover being cammed axially outwardly from its closed position to its open position with a substantial mechanical advantage by such rotational movement of the cover member.

A still further object of the invention is to provide a combination of the character described wherein the cover member is locked in its open position during operation by releasable lock means, and the cover member is biased toward its closed position, whereby the cover member is secured in its open position during operation of the reel, and closure of the cover member after operation of the reel is accomplished by simply releasing the lock means, which permits the biasing means to automatically return the cover member to its closed position.

A further object of the invention is to provide a novel reel and cover combination which is particularly compact, requiring approximately 50% less storage space than the conventional reel and canister storage means, and which is particularly efficient in operation, saving substantial operator time by eliminating the need for removing a reel from and replacing it in a secondary container or storage device.

A still further object is to provide a reel and cover combination wherein the parts are never completely separated from each other in normal operation, whereby identification of the contents of the reel that is disposed on the cover never becomes separated from the reel.

Other objects and advantages will become apparent from the following description and drawings, wherein:

*Detailed description*

Figure 2:
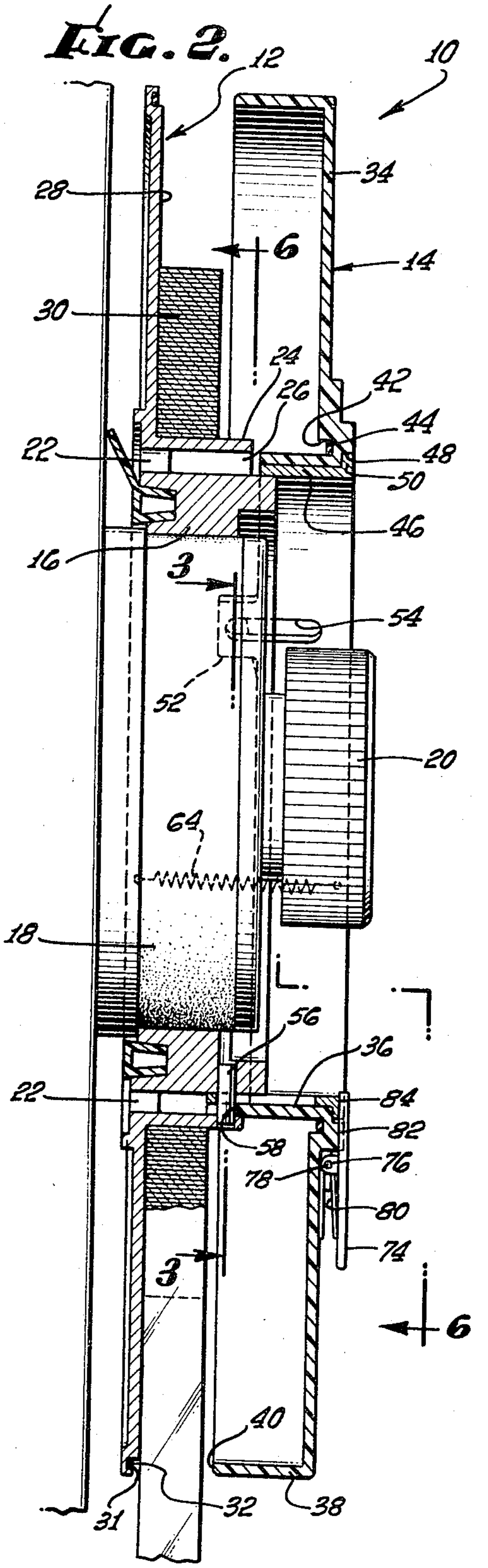
FIGURE 2 is a vertical section taken on the line 2—2 in FIGURE 1, with portions in elevation, illustrating my reel with the cover portion locked in its open position.

A presently preferred embodiment of the invention is illustrated in detail in the drawings, in the form of a tape reel 10 for the storage and use of magnetic recording tape in connection with a computer. The tape reel 10 includes a base portion generally designated 12 which is adapted to be removably mounted on the tape transport and upon which the tape is wound, and a cover portion generally designated 14 which is movable between a closed position as best illustrated in FIGURE 4 for storage of the tape and an open position as best illustrated in FIGURE 2 for use of the tape.

Figures 3, 4, 5:
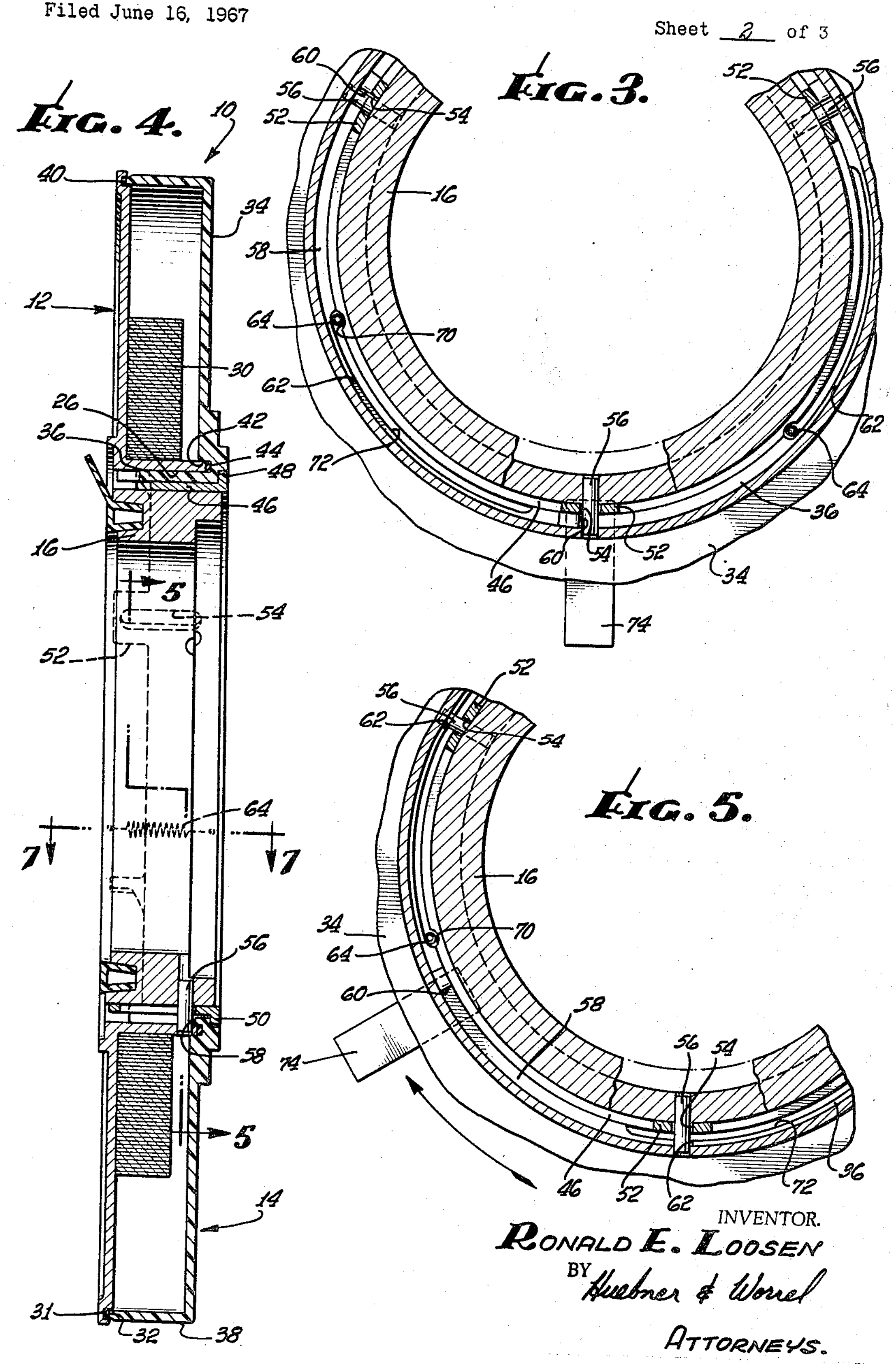
FIGURE 3 is a fragmentary vertical section taken on the line 3—3 in FIGURE 2.
FIGURE 4 is a vertical section of my reel similar to FIGURE 2, but with the reel removed from the tape transport and the cover portion in its closed position.
FIGURE 5 is a fragmentary sectional view similar to FIGURE 3, but with the cover portion of the reel rotated from the open position illustrated in FIGURES 2 and 3 to the close position of FIGURE 4.

The base portion 14 of the tape reel 10 includes an annular hub 16 which is engaged over and releasably secured to the expandable spindle 18 of a conventional tape transport as illustrated in FIGURE 2. Adjustment of the spindle 18 between a contracted release position and an expanded locking position is accomplished by manipulation of a conventional lock handle 20 which projects axially outwardly from the spindle 18 and also from the hub 16 of the tape reel.

A tape support collar 24 forms a part of the hub structure, being connected to the hub 16 by a series of web members 22. Collar 24 is spaced radially outwardly from the hub 16 to provide an annular clearance 26 between the hub 16 and the collar 24. Extending radially outwardly from the hub structure is a generally flat, annular base plate 28. Magnetic tape 30 is wound upon the tape support collar 24, with one edge of the tape convolutions guided by the plate 28, adjacent the outer periphery of the plate 28 is an upwardly facing annular groove 31 within which an annular resilient sealing gasket 32 is disposed, the gasket 32 comprising either a fitted gasket member or sealing material placed in the groove 31.

The cover portion 14 of the tape reel 10 includes a generally flat annular cover plate 34 having an inner cylindrical flange 36 and an outer cylindrical flange 38. The inner flange 36 is both axially and rotationally movable in the annular clearance 26, telescoping immediately within the tape support collar 24. The outer cylindrical flange 38 has a lower rim or edge 40 which seats against the sealing gasket 32 on the base plate 28 in the closed position of the cover 14 as best illustrated in FIGURE 4.

A downwardly facing annular groove 42 is disposed in the cover plate 34 immediately adjacent to its inner flange 36, and a sealing gasket 44 is disposed in groove 42, being either a separate gasket member or sealing material placed within the groove 42. In the closed position of the cover as shown in FIGURE 4, the upper edge of tape support collar 24 seats against the sealing gasket 44. Accordingly, when the cover portion 14 of the tape reel is in its closed position, a substantially dust-tight seal is provided by engagement of the outer cover flange 38 against the outer sealing gasket 32 and the tape support collar 24 against the inner sealing gasket 44, with the tape 30 being completely housed or compartmentalized between the plates 28 and 34 in the axial direction and between the collar 24 and flange 38 in the radial direction. While a substantially dust-tight seal will normally be adequate, it is contemplated that where desirable the seal will also be a moisture-tight seal, and may constitute a hermetic seal. The combined rotational and axial movement of the cover 14, to be described in detail hereinafter, as it approaches the closed position allows a certain amount of automatic seating adjustment against the sealing gaskets to provide a much more effective seal than can be reliably achieved with a straight axial type of movement as was employed in the prior art.

A ring or sleeve 46 is disposed in annular clearance 26 between hub 16 and cover flange 36, the cover having an annular notch 48 therein to receive an out-turned head flange 50 on the ring 46. The ring 46 is adapted for straight axial telescoping movement relative to hub 16, and the engagement between ring 46 and cover flange 36 allows rotational movement of cover 14 relative to ring 46 while the cover 14 and ring 46 remain in fixed relationship in the axial direction.

The ring or sleeve 46 has three downwardly extending ears 52 regularly spaced thereabout, and has three axially oriented slots 54 therein which are also regularly spaced about the ring 46 and extend into the ear portions 52 of the ring. Three pins 56 are regularly spaced about the hub 16, being seated in radially oriented bores in the hub 16 and collar 24 so as to extend across the annular clearance 26 near the upper edge of the tape support collar 24. The three pins 56 extend through the respective axial slots 54 in the ring 46.

Figure 9:
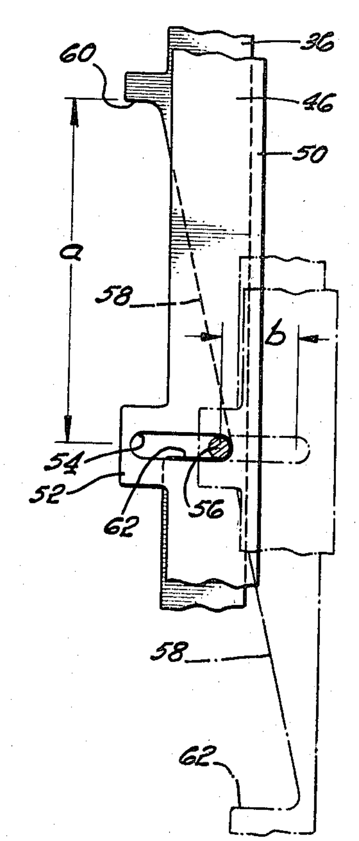
FIGURE 9 is a diagrammatic view illustrating cooperating arcuate portions of the cover and ring opened out into the plane of the sheet so as to illustrate the helical cam opening action of the cover.

The inner cylindrical flange 36 of the cover 14 is provided with three generally downwardly facing inclined cam surfaces 58 which are regularly spaced about the flange 36, and are preferably each contoured as a segment of a helix. Each of the inclined cam surfaces 58 terminates at its ends in downwardly projecting, opposed shoulders 60 and 62. Each of the cam surfaces 58 rides on a respective one of the pins 56 between the closed position of the cover 14 wherein the pins 56 are adjacent the respective shoulders 62 and shown in solid lines in FIGURE 9, and the open position of cover 14 wherein the pins 56 are adjacent the respective shoulders 60 as shown in phantom lines in FIGURE 9.

Figures 6, 7, 8:
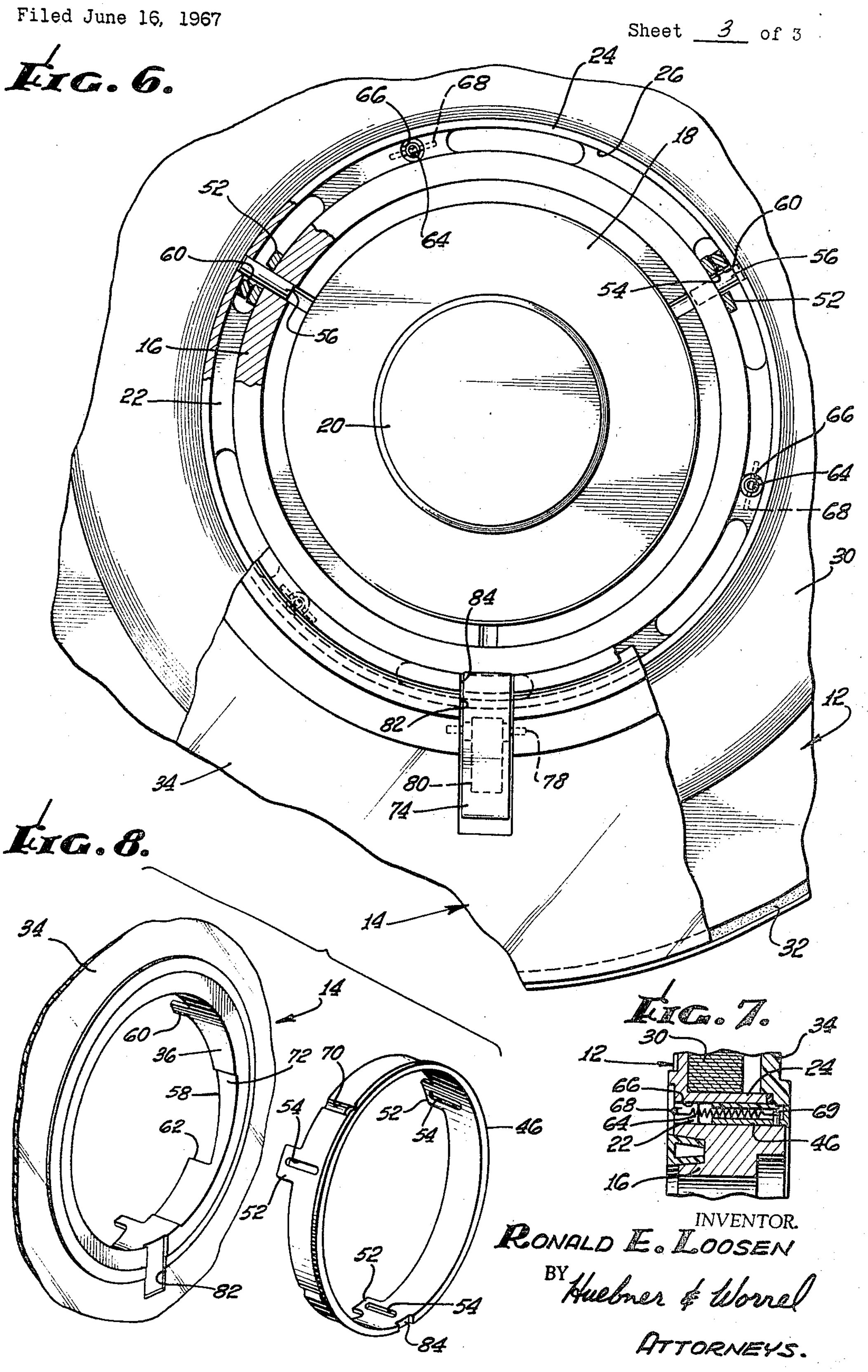
FIGURE 6 is a fragmentary vertical section taken on the broken section line 6—6 in FIGURE 2 so as to illustrate the invention partly in elevation and partly in section.
FIGURE 7 is a fragmentary horizontal section taken on the line 7—7 in FIGURE 4 and particularly illustrating one of the springs employed for biasing the cover portion of the reel toward the closed position.
FIGURE 8 is a fragmentary, exploded perspective view of the cover and ring portions of the reel.

Biasing of the cover 14 toward its closed position is accomplished by three small coil springs 64 that are regularly spaced about the hub 16, the springs 64 being generally axially oriented and being connected at their lower ends to respective web members 22 of the base portion 12 of the reel and at their upper ends to the ring 46. Mounting of the springs 64 is best illustrated in FIGURE 7, the lower ends of the springs 64 extending through holes 66 in the respective webs 22 and being held by pins 68 which extend across the holes 66 below the respective webs 22, and the upper ends of the springs 64 being attached to respective pins 69 that are integrally mounted on the ring 46. Clearance for the springs 64 is provided between the ring 46 and the tape support collar 24 by respective axial grooves 70 in the sleeve 46 and arcuate clearance recesses 72 in the flange 36. The springs 64 are tension springs which bias the ring 46 axially downwardly from the open position of the ring as best shown in FIGURE 2 and in phantom in FIGURE 9 to the closed position of the ring as best shown in FIGURES 4 and 7 and in solid lines in FIGURE 9. This downward biasing force is transmitted from the head flange 50 of the ring 46 to the cover portion 14 of the reel, so that the cover portion 14 is likewise biased from its open position toward its closed position.

Figure 1:
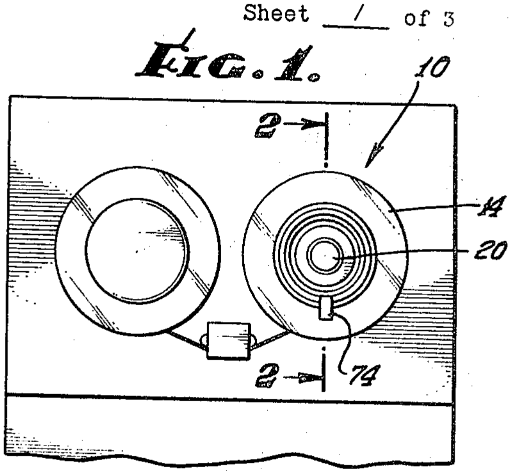
FIGURE 1 is a diagrammatic elevational view illustrating the present invention operatively mounted on a tape transport, as for example for use in a computer.

Thus, because of the biasing springs 64 the cover 14 will normally be held by the springs in its closed position. The tape reel 10 will remain in this closed position during storage, and while the reel is being moved from storage into its operative position mounted on the transport spindle 18 as illustrated in FIGURE 2. When thus mounted on the spindle, the cover 14 is moved from the closed to the open position by merely placing one hand on the periphery of the cover and applying a rotary movement thereto, the transport spindle holding the base portion 12 of the reel fixed during such rotary movement of the cover. With the inclined cam surfaces 58 oriented as illustrated in the drawings, this rotary opening movement is a clockwise movement of the cover relative to the base as viewed from the top of the cover, as in FIGURES 1 and 6, and an anticlockwise movement as viewed from the bottom, as illustrated in FIGURES 3 and 5. This rotational movement causes the inclined cam surfaces 58 to slide against the respective pins 56 so as to ramp the cover portion 14 axially outwardly relative to the base portion 12, the cover portion 14 carrying the ring 46 axially outwardly therewith against the biasing force of the springs 64. The fully opened position of cover 14 may be determined either by engagement of the lower ends of the ring slots 54 against the respective pins 56, or engagement of the shoulders 60 at the ends of the cam surfaces 58 against the pins 56. By the provision of three regularly spaced cam surfaces 58 and respective pins 56, this outward ramping movement of the cover 14 relative to the base 12 is accomplished with the rim or edge 40 of the outer cover flange 38 at all times remaining substantially parallel to the base plate 28 on the base. Thus, when the cover is in its outermost position as best illustrated in FIGURE 2, the tape is guided during operation of the reel between the base plate 28 and the cover rim 40. By this means, the usual second, outer plate or flange on the base portion of the reel parallel to the plate 28 is unnecessary, since the rim 40 serves its feeding function, and since the cover plate 34 performs its storage function. However, if desired, such a second, outer plate (not shown) may be embodied on the base portion 12 of the reel parallel to the plate 28, and extending radially outwardly from the tape support collar 24 above the tape 30.

The cover 14 is releasably locked in its open position during operation by means of a locking key 74 which has a downwardly extending integral ear 76 at the fulcrum for pivotal attachment to the cover 14 by means of a pin 78. The locking key 74 is biased toward its lock position by means of a spring 80 as best shown in FIGURE 2, the locking key 74 being biased in an anticlockwise direction as viewed in FIGURE 2. Locking key 74 is preferably radially oriented, its outer end portion providing an operating tab or handle, and its inner end portion seating in a notch 82 in cover 14 and a notch 84 in ring 47 so as to lock the cover 14 and ring 46 against relative rotation. This securely fixes the cover 14 in its outer, operative position since the cover cannot move axially toward the closed position without rotational movement. When it is desired to close the cover 14, all that is necessary is to press down against the locking key 74 radially outwardly from its fulcrum, thereby raising the inner end of the locking key upwardly out of the notch 84 in the ring 46, which frees the cover 14 for rotation, and thereby allows the biasing springs 64 to move the ring 46 axially toward its closed position, so that the head flange 50 on the ring 46 will move the cover 14 axially toward its closed position. However, the cover 14 is constrained to a generally spiral or helical path by engagement of the inclined cam surfaces 58 against the pins 56, whereby the closing movement of the cover 14 will be a combined rotational and axial movement, the rotational component at the radius of the inner cover flange 36 being through the arc length *a* in FIGURE 9, and the axial component being the distance *b* in FIGURE 9. The rotational component of this movement of the cover 14 between its open and closed positions, with the inclined cam surfaces 58 oriented as illustrated in the drawings, is anticlockwise when the cover is viewed from the front as in FIGURES 1 and 6, or clockwise as viewed from the rear or bottom, as in FIGURES 3 and 5. During this closing movement of the cover 14, the inner end of the locking key 74 will simply ride along the head flange 50 of the ring 46, so that the locking key 74 need only be momentarily depressed to release the cover 14 from its open, locked position, and the locking key 74 may then be released and the cover 14 will automatically rotate and move axially from the open to the fully closed position.

The biasing force of the springs 64 will normally be adequate to secure the cover 14 in its closed position during storage and handling. However, if desired, a second notch similar to notch 84 may be placed in the head flange 50 of ring 46 so as to come into alignment with the locking key 74 in the fully closed position of cover 14 to lock the cover 14 in the closed position.

While the instant invention has been shown and described herein in what is conceived to be the most practical and preferred embodiment, it is recognized that departures may be made therefrom within the scope of the invention, which is therefore not to be limited to the details disclosed herein.

What is claimed is:

1. A reel for the storage and use of a flexible strip which comprises a base portion including hub structure adapted for winding the strip thereon and having a generally flat base plate extending radially outwardly therefrom, and a cover portion mounted on said hub structure for movement in a generally spiral path between closed and open positions, said cover portion including a generally flat cover plate having a flange proximate its outer periphery, the flange engaging the base plate in said closed position of the cover portion so as to peripherally close the reel, and the flange being spaced from said base plate in said open position of the cover portion to provide clearance for feeding the strip onto and off of the reel, said cover portion rotating less than a full turn relative to said base portion in said spiral path between said closed and open positions.

2. A reel as defined in claim 1, wherein said hub structure, base plate, cover plate and flange define a substantially closed annular chamber in said closed position of the cover portion.

3. A reel as defined in claim 2, which includes first resilient annular sealing means engageable between said base plate and flange in said closed position and second resilient annular sealing means engageable between said cover plate and hub structure in said closed position.

4. A reel as defined in claim 1, wherein said cover portion includes an annular inner flange engaged in said hub structure for both rotational and axial telescoping movement, and including guide means engageable between said inner flange and hub structure defining said generally spiral path of movement of the cover portion between its said closed and open positions.

5. A reel for the storage and use of a flexible strip which comprises a base portion including hub structure adapted for winding the strip thereon and having a generally flat base plate extending radially outwardly therefrom, a cover portion mounted on said hub structure for movement in a generally spiral path between closed and open positions, said cover portion including a generally flat cover plate having a flange proximate its outer periphery, the flange engaging the base plate in said closed position of the cover portion so as to peripherally close the reel, and the flange being spaced from said base plate in said open position of the cover portion to provide clearance for feeding the strip onto and off of the reel, and biasing means between said cover portion and hub structure biasing the cover portion toward its said closed position.

6. A reel as defined in claim 5, which includes releasable lock means engageable between said cover portion and hub structure in said open position, release of said lock means permitting said biasing means to automatically return the cover means to its said closed position.

7. A reel for the storage and use of a flexible strip which comprises a base portion including hub structure adapted for winding the strip thereon and having a generally flat base plate extending radially outwardly therefrom, and a cover portion mounted on said hub structure for movement in a generally spiral path between closed and open positions, said cover portion including a generally flat cover plate having a flange proximate its outer periphery, the flange engaging the base plate in said closed position of the cover portion so as to peripherally close the reel, and the flange being spaced from said base plate in said open position of the cover portion to provide clearance for feeding the strip onto and off of the reel, said cover portion including an annular inner flange engaged in said hub structure for both rotational and axial telescoping movement, and including guide means engageable between said inner flange and hub structure defining said generally spiral path of movement of the cover portion between its said closed and open positions, said guide means comprising a plurality of spaced pin members supported in said hub structure and a plurality of cam surfaces on said inner flange slideably engaged against the respective said pin members, said cam surfaces being inclined relative to the general plane of the reel.

8. A reel for the storage and use of a flexible strip which comprises a base portion including hub structure adapted for winding the strip thereon and having a generally flat base plate extending radially outwardly therefrom, a cover portion mounted on said hub structure for movement in a generally spiral path between closed and open positions, said cover portion including a generally flat cover plate having a flange proximate its outer periphery, the flange engaging the base plate in said closed position of the cover portion so as to peripherally close the reel, and the flange being spaced from said base plate in said open position of the cover portion to provide clearance for feeding the strip onto and off of the reel, said cover portion including an annular inner flange engaged in said hub structure for both rotational and axial telescoping movement, and including guide means engageable between said inner flange and hub structure defining said generally spiral path of movement of the cover portion between its said closed and open positions, a ring engaged in said hub structure for axial telescoping movement, said ring being restrained against rotation relative to the hub structure, the ring being disposed adjacent to and coupled with said inner cover flange so as to move axially therewith as the cover portion follows its generally spiral path between the closed and open positions, and biasing means engageable between said ring and hub structure urging the ring toward its closed telescoped position in the hub and thereby biasing the cover portion toward it closed position.

9. A reel as defined in claim 8, which includes releasable lock means engageable between said cover portion and ring in the open position of the cover portion, said lock means locking the cover portion against rotation relative to the ring and thereby locking the cover portion in its open position, release of said lock means permitting said biasing means to automatically return the cover portion to its said closed position.

10. A reel as defined in claim 9, wherein said lock means comprises a notch in the ring and a lever member mounted on the cover portion and releasably engageable in said notch.

11. A reel as defined in claim 10, wherein said lever is biased toward its engaged position in the notch.

12. A reel as defined in claim 9, wherein said guide means comprises a plurality of spaced pin members supported in said hub structure and a plurality of cam surfaces on said inner flange slideably engaged against the respective said pin members, said cam surfaces being inclined relative to the general plane of the reel, the ring having a plurality of axially oriented slots therein through which the respective said pin members extend to restrain the ring against rotation while allowing axial movement thereof.

References Cited

UNITED STATES PATENTS

| | | | |
|---|---|---|---|
| 2,422,032 | 6/1947 | Mihalyi | 206—52 |
| 2,766,068 | 10/1956 | Roissard | 220—39 |
| 3,307,689 | 3/1967 | Lyman | 206—52 |
| 3,349,898 | 10/1967 | Palson et al. | 206—52 |

MARTHA L. RICE, *Primary Examiner.*